United States Patent [19]

Anderson

[11] Patent Number: 4,482,006
[45] Date of Patent: Nov. 13, 1984

[54] THERMAL ENERGY METER

[76] Inventor: Cary R. Anderson, 428 E. Chapel St., Rockton, Ill. 61072

[21] Appl. No.: 469,126

[22] Filed: Feb. 23, 1983

Related U.S. Application Data

[62] Division of Ser. No. 183,433, Sep. 2, 1980, Pat. No. 4,393,919.

[51] Int. Cl.³ .............................................. F28F 27/00
[52] U.S. Cl. .................................... 165/11 R; 236/94; 364/557; 374/41; 374/186
[58] Field of Search ........................ 165/11 R; 236/94; 364/557; 374/39, 41, 102, 103, 115, 186

[56] References Cited

U.S. PATENT DOCUMENTS

| | | | |
|---|---|---|---|
| 1,359,914 | 11/1920 | Petersen | 374/39 |
| 2,329,813 | 9/1943 | Amsler | 374/39 |
| 3,301,049 | 1/1967 | Meyerson | 374/41 |
| 3,489,006 | 1/1970 | Holdsworth | 374/41 |
| 4,002,890 | 1/1977 | Welin | 235/183 |
| 4,048,852 | 9/1977 | Sakakibara et al. | 374/41 |
| 4,049,044 | 9/1977 | Cohen | 236/94 |
| 4,186,563 | 2/1980 | Schulze, Sr. | 165/11 |
| 4,306,293 | 12/1981 | Marathe | 364/557 |

FOREIGN PATENT DOCUMENTS

| | | | |
|---|---|---|---|
| 2407250 | 8/1975 | Fed. Rep. of Germany | 374/41 |
| 2847217 | 5/1980 | Fed. Rep. of Germany | 374/41 |
| 2901270 | 7/1980 | Fed. Rep. of Germany | 374/41 |
| 2902457 | 8/1980 | Fed. Rep. of Germany | 374/41 |
| 2399060 | 3/1979 | France | 236/94 |
| 2077928 | 12/1981 | United Kingdom | 374/103 |

Primary Examiner—Stephen F. Husar

[57] ABSTRACT

A device for monitoring the thermal energy consumed by a single unit of a multi-unit building having a central heating and/or cooling space conditioning system, said device comprising a monitoring system responsive to the temperature levels contained in said single unit and of the space conditioning heat exchanger within said unit and a monitoring circuit which comprises a temperature measuring circuit for monitoring temperature levels. A recording and display circuit is electrically coupled to the temperature measuring circuit to provide a totalization and reading of accumulated temperature levels within a unit during a monitoring interval.

12 Claims, 6 Drawing Figures

THERMAL ENERGY METER

This application is a division of application Ser. No. 183,433, filed 09/02/80, now U.S. Pat. No. 4,393,919.

BACKGROUND OF THE INVENTION

1. Field of the Invention

The present invention relates generally to a heat consumption meter for use in buildings and, in particular, a meter for determining the energy consumed for heating and cooling individual units in a multi-unit building using a central heating and/or cooling system.

2. Description of Prior Art

Known meters which have been used to meter heating and cooling energy consumption in individual units of a multi-unit building, such as an apartment building, using a central heating/cooling source are of two basic types. The first uses a time recording meter, or hour meter, to record the amount of time the room thermostat calls for heating or cooling. The proportionate energy consumption between units is related to the time each unit's thermostat and thus heat exchanger is on. U.S. Pat. Nos. 3,995,686 and 4,049,044 disclose the use of this type of hour meter. The second type is commonly called a BTU meter and consists of a flowmeter to record the amount of water flow through a heat exchanger and two temperature sensors to measure and record the difference in input and output water temperatures from the heat exchanger. These two quantities are multiplied together to determine the amount of energy transferred to or from the heat exchanger via the water supply. Meters of this type have been available for many years and may be mechanical or electromechanical in construction.

The use of hour meters to meter heat suffers from severe limitations. In general, there is a very poor correlation between the amount of time a unit's thermostat or heat exchanger is on and the amount of heating or cooling energy consumed. This is due to variations in each zone of a central heating/cooling system and varying environmental conditions in each unit which cause heat exchangers to have unequal heat transfers for the same amount of operating time. Thus, the reading of an hour meter is not an accurate indication of individual unit heating and/or cooling energy consumption.

Generally, BTU meters are very accurate but are difficult to install and quite expensive, relatively complex, and subject to wear, failure, and inaccuracies in their moving parts. This has prevented their widespread use. In addition to BTU and hour meters there is one other device which is used to meter heat consisting of a glass capillary tube filled with alcohol which evaporates at a rate proportional to the temperature of the heat exchanger to which it is affixed. These meters offer poor accuracy and are cumbersome to read and to use. Also, the individual units must be entered to retrieve, read, and replace these meters. This is desirable to neither the building owners or the occupants.

The present invention proposes to provide a new heat meter which is accurate yet inexpensive in construction and provides remote reading for the convenience of building owners and occupants. The meter uses solid state electronics and temperature sensors to sense heat transfer rates and an electronic pulse generator to totalize these heat transfer amounts on a counter which can be located some distance away from the unit being metered for the convenience of remote meter reading. Installation does not require interrupting heating or cooling service to the unit nor cutting into piping. Accuracy is very high being limited only to the precision of the sensors and electronics used in the device.

It is an object of this invention to provide an aparatus for accurately and economically monitoring the heating and cooling energy consumed in a unit of a multi-unit building.

Other objects will in part be obvious and will in part appear hereinafter.

SUMMARY OF THE INVENTION

This invention relates to a new and useful device for the accurate and economical determination of the amount of heating and/or cooling thermal energy consumed by an occupant of a multi-unit building having a central heating and/or cooling space conditioning system. It is desirable in multi-unit buildings, such as apartment or condominium buildings, to pass on utility costs to the unit occupants through individual metering. This results in less costs for the building owner and reduces the total energy consumption of the unit occupants by approximately 30%. This effect for energy conservation derives from the direct responsibility unit occupants have with individual metering.

A typical space conditioning system consists of a heat exchanger in each unit of the building through which pass pipes which run throughout the building. These pipes carry either hot water for heating or cold water for cooling. The device is connected to the heat exchanger in each unit that is connected with the central system. The device will monitor the total amount of energy consumed by the unit occupant either in absolute units of measure or in proportion to the total energy consumed by the entire building thereby enabling one to ascertain the cost for energy consumed by each individual unit.

The device for monitoring the energy consumption of a unit of a multi-unit building incorporating a heat exchanger comprises a temperature measuring circuit to monitor air and heat exchanger temperatures within a unit. A recording and display circuit is coupled to the temperature measuring circuit to provide a totalization and reading of accumulated temperature levels. The recording and display circuit may consist of a pulse generator and counter or a microcoulometer.

BRIEF DESCRIPTION OF THE DRAWINGS

In drawings which illustrate embodiments of the present invention.

DESCRIPTION OF PREFERRED EMBODIMENT

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

Figure 1:
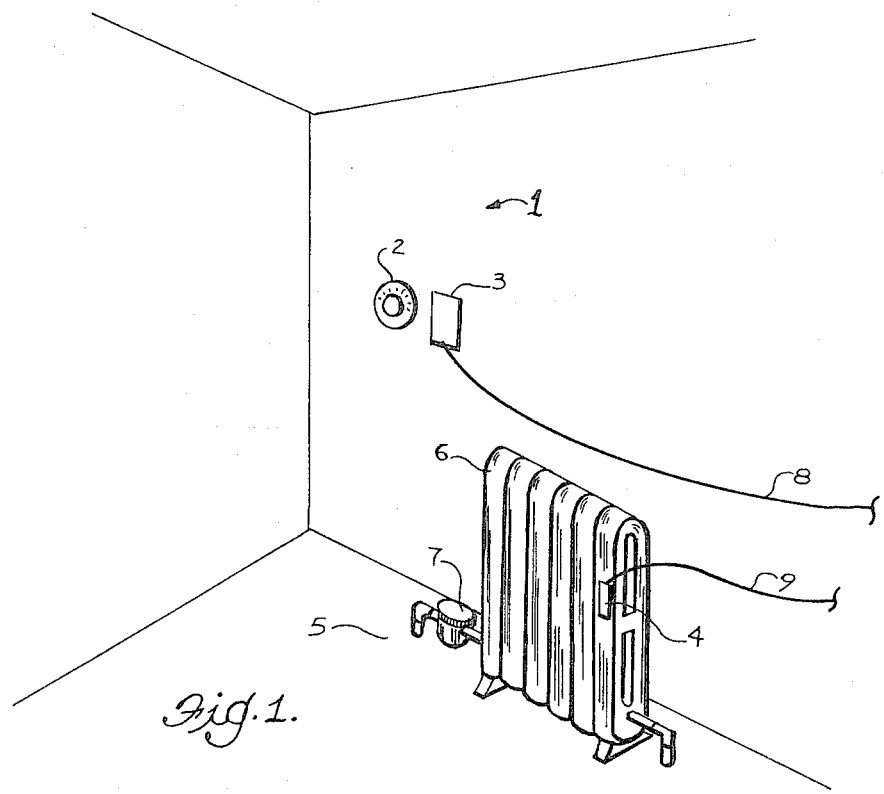
FIG. 1 illustrates a typical space conditioning heat exchanger and controls and sensors of the energy monitoring circuit embodied by this invention.

FIG. 1 illustrates the energy monitoring system 1 in placement with a space conditioning system 5. The energy monitoring system 1 being comprised of temperature sensor 3 which is exposed to and thermally coupled with room temperature and temperature sensor 4 which is thermally coupled to the heat exchanger 6. Temperature sensors 3 and 4 are connected to remaining circuitry, not shown in FIG. 1, by leads 8 and 9. In operation, room thermostat 2 activates control valve 7 when the room temperature exceeds a preset limit allowing heating or cooling fluid to flow through heat exchanger 6 until the room thermostat 2 senses an in-limit room temperature whereas temperature sensors 3 and 4 sense the room temperature and the temperature of heat exchanger 6.

Figures 2, 3:
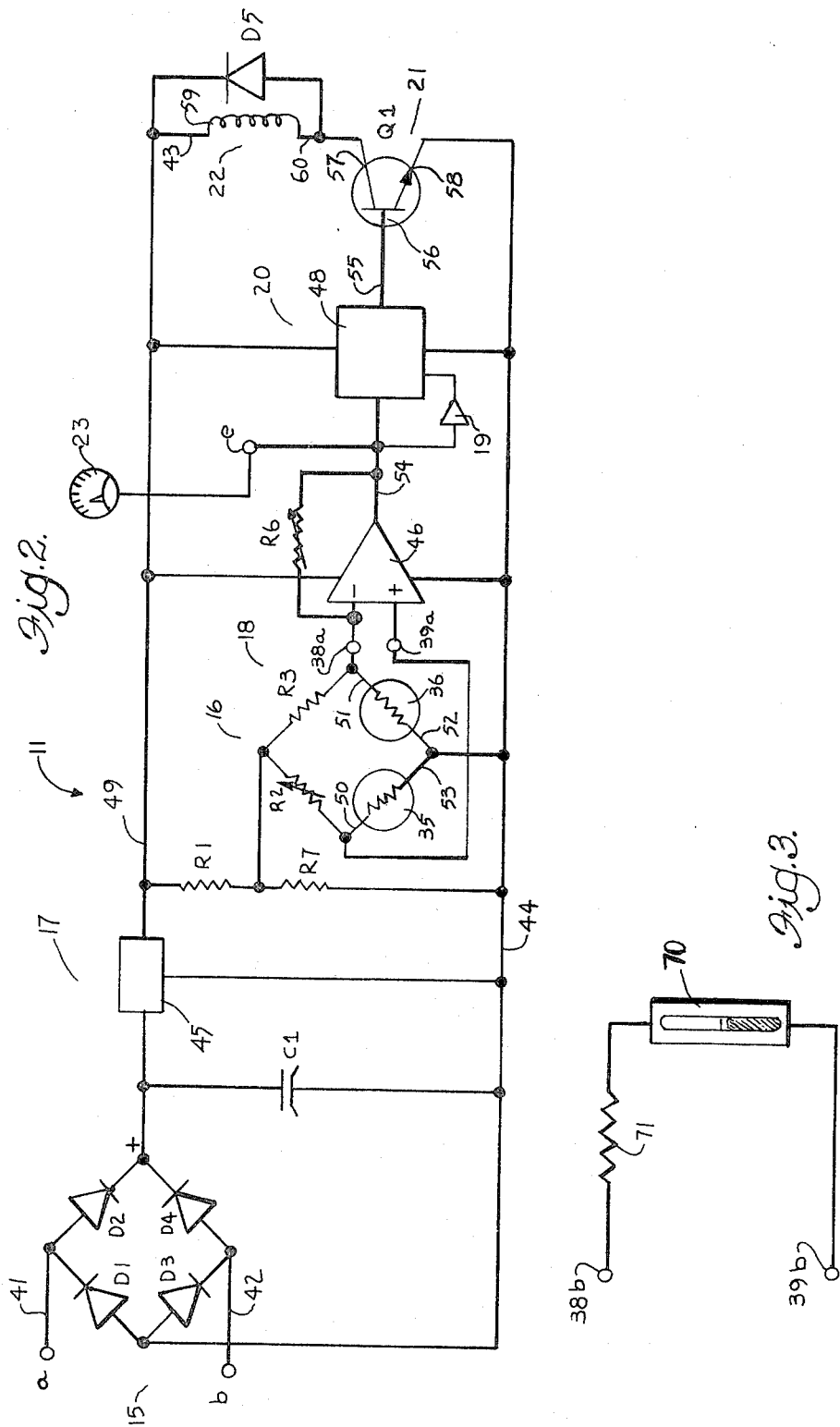
FIG. 2 is a circuit diagram of the preferred embodiment of the energy monitoring circuit according to the present invention.
FIG. 3 is a circuit diagram of a recording and display means of the energy monitoring circuit embodied by this invention.

FIG. 2 is a circuit diagram of the energy monitoring circuit 11 embodied by this invention. The energy monitoring circuit 11 monitors the amount of thermal energy used in a unit and is electrically coupled to a power source 15, not shown, at points a and b. Said power source can be low voltage AC or DC power supplied by the space conditioning control system, a step-down transformer connected to the building power system, or other means as the application of this device to a particular building requires. The power supply 17 adjusts the power supplied by a power source 15, not shown, to the value and form required by the energy monitoring circuit 11.

The energy monitoring circuit 11 comprises a power supply 17, a sensor unit 16, a differencer 18, a pulse generator 20, an amplifier 21, and a pulse counter 22. The power supply 17 comprising diodes D1, D2, D3, and D4 forming a bridge rectifier which converts the power from power source 15, not shown, to direct current if necessary and applies the proper power polarity to the filter capacitor C1 and the voltage regulator 45 which is of a type well known in the art. The power supply 17 provides power to the remaining circuitry via the common ground line 44 and the common positive line 49 at a typical voltage of 12 volts direct current.

The temperature sensors 35 and 36 of the sensor unit 16 are thermistors or other similar temperature sensitive devices which are connected to the differencer 18 via leads 50, 51, 52, and 53. Said temperature sensors 35 and 36 correspond to temperature sensors 3 and 4 of FIG. 1. The differencer 18 is comprised of voltage dividing resistors R1 and R7 to limit voltage to about one volt to limit the self-heating of temperature sensors 35 and 36 which with resistor R3 and potentiometer R2 form a wheatstone bridge. Potentiometer R2 is used to balance the bridge to a null state with temperature sensors 35 and 36 at the same temperature. The output of this wheatstone bridge varies in direct proportion to the temperature difference existing between sensors 35 and 36 and is coupled to operational amplifier 46 at points 38a and 39a. The operational amplifier 46 is of a type well known in the art and amplifies and conditions the signal from the wheatstone bridge. The scale factor of the operational amplifier 46 is controlled by resistor R6. The output of the operational amplifier 46 is the differencer unit 18 output which is coupled to a voltage-to-frequency converter 48 via lead 54. A point e is electrically coupled to the differencer circuitry via lead 54 and allows the attachment to the energy monitoring circuit 11 of a meter 23 so that the rate of energy use may be observed.

The pulse generator 20 is comprised of a voltage-to-frequency converter 48 of a type well known in the art and is readily available in the market and therefore I have chosen not to illustrate its circuitry. The voltage-to-frequency converter 48 is coupled to the differencer circuitry via lead 54 and generates pulses, the repetition rate which is directly proportional to the output signal of the differencer circuitry 18. The output lead 55 of the pulse generator 20 is coupled to amplifier 21.

The amplifier 21 comprises an amplifier transistor Q1 having its base 56 coupled to the output lead 55 of the voltage-to-frequency converter 48 and its emitter 58 electrically coupled to the common ground line 44. The collector 57 of transistor Q1 is electrically coupled to one end of a counter solenoid 59 and diode D5 of the counter 22, the diode D5 and coil 59 being electrically connected in parallel by means of lead 60. The other end of the counter solenoid coil 59 and diode D5 are electrically coupled to the common positive line 49 via lead 43. Said counter coil 59 can be located some distance away from said energy monitoring circuit so as to provide remote metering.

It is understood that amplifier Q1 would not be required if an electronic pulse counter were to be used instead of the electromechanical counter described herewithin. Additionally, amplifier Q1 can be integrated with and a part of the voltage-to-frequency converter 48. The pulse counter 22, be it mechanical or electronic, is well known in the art and is readily available in the market.

The flow of heat depends on the difference in temperature between the air in the unit and the heat exchanger in the said building unit. This relationship is given by the formula $Q = K (T1-T2)^n$ where Q is the total heat transfer, (T1−T2) is the difference in air and heat exchanger temperatures, and n and K are constants which vary with the type of heat exchanger, n being an exponent generally on the order of 1.5. In operation, the flow of heat from, or to, said heat exchanger into, or from, a room of said unit passes through the sensor unit 16 comprising temperature sensors 35 and 36 which change their electrical resistance according to their respective temperatures. The differencer 18 subtracts the signal of sensor 36 from the signal of sensor 35 and amplifies the resultant signal according to a scale factor set by R6 which can be set as necessary by the specific application to account for K and/or n in the previous formula. The signal from the differencer 18 is electrically coupled to the pulse generator 20 which developes pulses proportional to the temperature difference of sensors 35 and 36. These pulses are about 100 milliseconds in duration at a constant amplitude which is a nominal pulse duration for the operation of the solenoid coil 59 of counter 22 via the amplifier transistor Q1, which becomes conductive for the duration of each pulse fed into its base 56. At this time the conductivity of amplifier Q1 causes the solenoid coil 59 of counter 22 to become energized from the voltage present at the common positive line 49.

Each pulse fed to solenoid coil 59 and diode D5 of counter 22 causes a digital indicator, not shown, to be advanced by a solenoid plunger, not shown, which thereby provides a digital readout corresponding to the heat flow sensed by sensor unit 16. The reading as displayed on said digital indicator can be compared to other said units' readings to determine proportional energy consumption or can be multiplied by the said constant n to determine the energy consumption in absolute units, such as BTU's.

The circuitry for the monitoring circuit 11 can be mounted in a standard electrical cabinet or box, not shown, and also can be electrically coupled to the existing thermostat 2 of FIG. 1 in said unit of the multi-unit building so as to turn on and begin monitoring when said thermostat calls for heating or cooling energy. A separate thermostat, not shown, can be mounted on said heat exchanger so as to indicate use of said heat exchanger where a non-electrical thermostat and control system is used. An internal level comparator 19, can also be used to sense a preset heat flow signal from the differencer 18 and control the said energy monitoring circuit instead of said thermostat 2.

FIG. 3 illustrates a second embodiment of the preferred invention by disclosing additional means of recording and displaying the signal from the temperature sensors 35 and 36 and R2 and R3 forming a wheatstone bridge in which an indicating microcoulometer 70 of a type well known in the art integrates and records the output from the wheatstone bridge section of differencer 18. Resistor 71 sets the scale factor for the microcoulometer 70. The points 38a-38b and 38a-39b of FIGS. 2 and 3 are electrically coupled together and operational amplifier 46, pulse generator 20, amplifier 21, and counter coil 59 and diode D5 of FIG. 2 are thereby omitted. This recording and display means has the advantages of simpler construction and lower cost with a small reduction in accuracy compared to the recording and display means of FIG. 2.

Figure 2A:
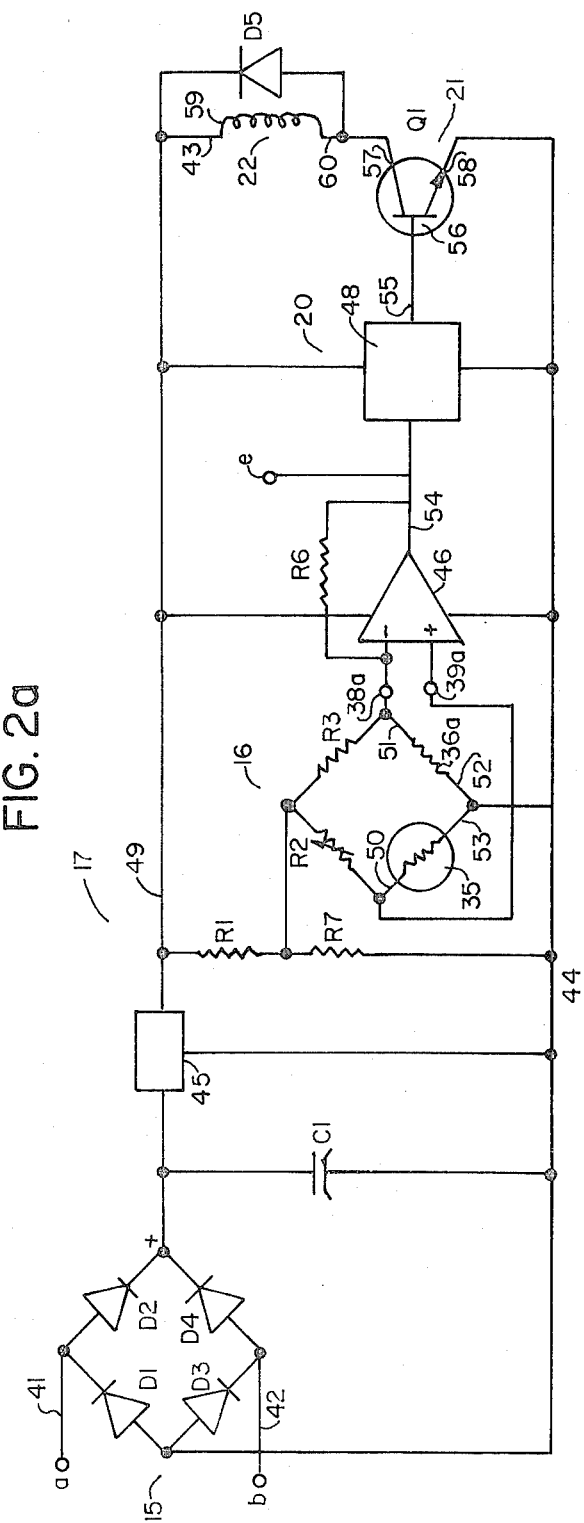
FIG. 2a is an additional embodiment of the invention.

It is understood that instead of measuring both the air and heat exchanger temperatures, one temperature can be assumed and only the other temperature need actually be measured. This can result in a simpler meter with a reduced accuracy of 10-15%. In this application temperature sensor 36 can be omitted with respective changes in the circuitry of FIG. 2 or be replaced with a fixed value resistor 36a as shown in FIG. 2a. Thus only the heat exchanger temperature will be measured. Temperature sensor 35 can be omitted instead of sensor 36 in the manner just described so that only the air temperature is measured. Also, more than one of each temperature sensor 35 and/or 36 can be used to measure average temperatures more accurately than single sensors. Two temperature sensors can be used in place of heat exchanger temperature sensor 36 and can be thermally coupled to the heat exchanger fluid supply and return pipes respectively. By summing the outputs of these two said sensors and dividing the result by two, the average temperature of the heat exchanger can be determined.

Figure 4:
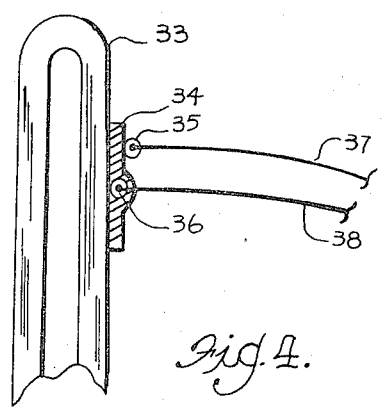
FIG. 4 illustrates a typical sensor configuration embodied by this invention.

FIG. 4 illustrates third embodiment of the preferred invention by disclosing a variation in the placement of temperature sensors 35 and 36 in which said sensors measure a temperature differential through a sensor element 34 thermally coupled to heat exchanger 33 to determine thermal energy transfer. Temperature sensor 36 is thermally coupled to heat exchanger 33 or to the interface formed at the meeting of heat exchanger 33 and sensor element 34. The sensor element 34 is comprised of a homogenous solid material having a known thermal conductivity. Said sensor element can consist of many different materials in a multitude of shapes and sizes. A typical sensor element 34 can consist of an electrically insulating pad for semiconductors which is well known in the art and readily available. Temperature sensor 35 is thermally coupled to the side of sensor element 34 opposite from that side which is affixed to said heat exchanger. Temperature sensors 35 and 36 are electrically coupled to the energy monitoring circuit of FIG. 2 by leads 37 and 38. The entire said sensor unit can be secured to the heat exchanger 33 in a multitude of ways such as by a section of adhesion tape which can also be thermally conductive in nature as with copper of aluminum foil tape to aid heat flow.

In operation, thermal energy flow is monitored by the formula $Q = K (T1 - T2)$ where Q is the energy flow amount, K is a constant depending upon the heat exchanger characteristics and the thermal conductivity of sensor element 34, and $(T1 - T2)$ is the difference in temperature between the two major sides of sensor element 34 as measured by temperature sensors 35 and 36.

Figure 5:
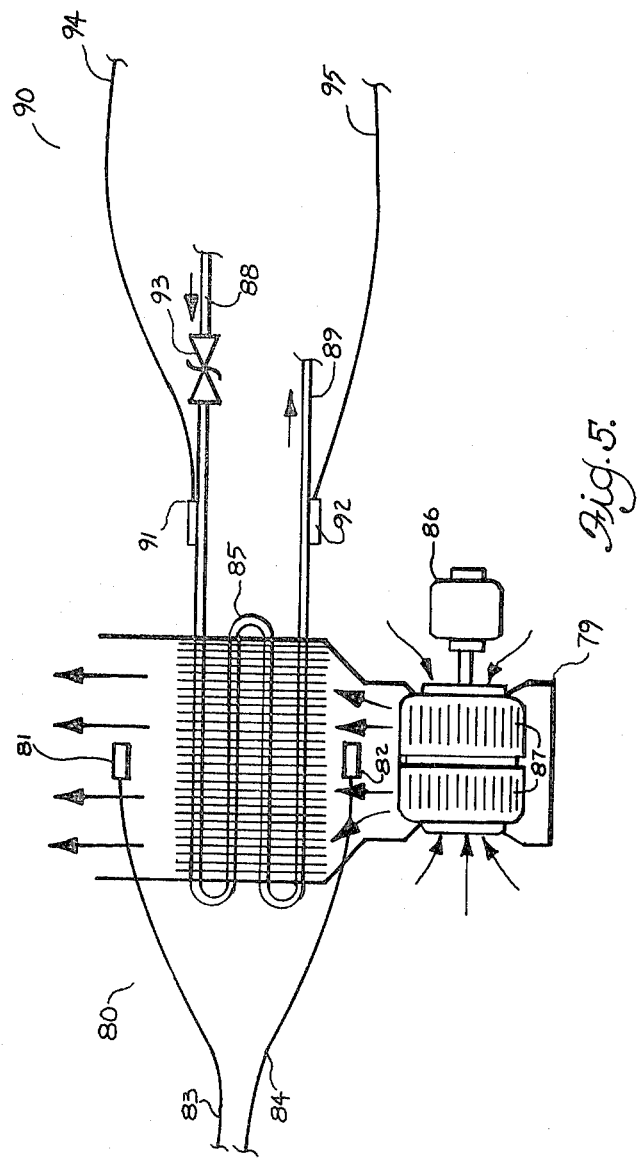
FIG. 5 illustrates a typical space conditioning heat exchanger and temperature sensor arrangement embodied by this invention.

FIG. 5 illustrates two further applications of said energy monitoring circuit. A typical space conditioning heat exchanger unit 79 consists of a heat exchanger 85, a fluid supply pipe 88, a fluid return pipe 89, an air moving blower fan 87, and a blower motor 86. Temperature sensors 81 and 82 are exposed to the airflow over the heat exchanger 85 from blower fan 87 and correspond respectively to temperature sensors 35 and 36 of FIG. 2 being electrically coupled to said energy monitoring circuit via leads 83 and 84. Sensor 81 is exposed to the output airflow to heat exchanger 85 and sensor 82 is exposed to the input airflow to heat exchanger 85. The difference in temperature of the air flowing over heat exchanger 85 is proportional to the thermal energy transferred to or from said unit. Variations in airflow rates from blower 87 can be accounted for by varying the scale factor of differencer 18 of the energy monitoring circuit of FIG. 2 by changing the value of scale factor gain setting resistor R6 so that the amplification scale factor of differencer 18 is proportional to the air flow rate from blower 87. Space conditioning heat exchanger unit 79 can also be a part of a forced air furnace, not shown, which derives its principal source of energy from a central system such as a natural gas supply system.

The energy monitoring circuit of FIG. 2 can additionally be applied as shown in FIG. 5 by the monitoring and control combination 90. Temperature sensors 91 and 92 are thermally coupled to and measure the temperature of the fluid of supply and return pipes 88 and 89 respectively. Sensors 91 and 92 correspond to sensors 35 and 36 of the energy monitoring circuit of FIG. 2 and are electrically coupled to said energy monitoring circuit via leads 94 and 95. The thermal energy tranferred by heat exchanger 85 is proportional to the temperature difference in the fluid supply and return temperatures as measured by sensors 91 and 92. The flowrate of said fluid through heat exchanger 85 is set at a fixed rate automatically under all flow conditions by flow regulator 93 which is of a type well known in the art. Thus no expensive and complex flowmeters are required to totalize the flow of fluid through said heat exchanger.

It is understood that the electrical components illustrated in the figures and their relationship to each other can vary in value depending upon the scale factor and the exact components used. I have found that the following values for the parameters illustrated in the drawings are suitable for achieving a monitoring system capable of measuring the heating and cooling energy used by an individual unit of a multi-unit building:

| | |
|---|---|
| R1 - 12,000 ohms | C1 - 1,000 microfarads |
| R7 - 1,000 ohms | D1, D2, D3, D4, and D5 |
| R2 - 10,000 ohms | are standard circuit |
| R3 - 10,000 ohms | diodes. |
| R6 - 10,000 ohms | Sensors 35 and 36 are thermistors having a nominal resistance of 10,000 ohms at 20° C. |

It is further understood that the values and circuit configuration hereinabove set forth and illustrated in the drawings can vary without deviating from the spirit and scope of this invention.

It is believed that the invention has been described in such detail as to enable those skilled in the art to understand the same and it will be appreciated that variations can be made without departing from the spirit and scope of the invention.

I claim:

1. A device for monitoring the thermal energy used by a single unit of a multi-unit building having a central space conditioning system said device comprising an energy monitoring circuit having a temperature sensor thermally coupled to the entering air flow of a heat exchanger utilizing an air moving blower fan, a temperature sensor thermally coupled to the exiting air flow of said heat exchanger, a differencing means to determine the temperature difference between said temperature sensors, and a recording and display means for the totalization and reading of the energy consumption monitored wherein the amplification of said differencing means is varied to account to variations in air flow rates from said blower fan.

2. A device for monitoring the thermal energy used by a single unit of a multi-unit building having a central space conditioning system said device comprising an energy monitoring circuit having two temperature sensors, a differencing means to determine the temperature difference between said two temperature sensors, and a recording and display means for the totalization and reading of the energy consumption monitored wherein said two temperature sensors measure the temperature difference between a space conditioning heat exchanger and air in said single unit and said differencing means amplifies the temperature difference signal between said two temperature sensors by a value associated with the exponential heat transfer relationship of said heat exchanger.

3. The device of claim 2 wherein a rate of energy use meter is coupled to said differencing means.

4. The device of claim 2 wherein a fixed resistor is substituted for said temperature sensor measuring the air temperature in said single unit.

5. The device of claim 2 including a control circuit comprising a power source and thermostat in said single unit wherein said energy monitoring circuit is electrically coupled to said control circuit.

6. The device of claim 2 wherein said differencing means comprises an operational amplifier.

7. The device of claim 2 wherein said recording and display means comprises a voltage to frequency converter electrically coupled to a pulse counter.

8. The device of claim 2 wherein each said two temperature sensors each comprise a plurality of sensing elements.

9. The device of claim 2 wherein said differencing means amplifies the temperature difference signal between said two temperature sensors by an amplification factor to account for heat transfer variances between heat exchangers of different sizes and construction.

10. The device of claim 2 wherein a resistor limits the voltage applied to said temperature sensors to limit the self-heating of said temperature sensors.

11. A device for monitoring the thermal energy used by a single unit of a multi-unit building having a central space conditioning system said device comprising an energy monitoring circuit having two temperature sensors, a differencing means to determine the temperature difference between said two temperature sensors, and a recording and display means for the totalization and reading of the energy consumption monitored wherein said two temperature sensors measure the temperature difference between a space conditioning heat exchanger and air in said single unit and said energy monitoring circuit is controlled by a level comparator which activates said energy monitoring circuit when the temperature difference signal from said differencing means exceeds a preset level.

12. A device for monitoring the thermal energy used by a single unit of a multi-unit building having a central space conditioning system said device comprising an energy monitoring circuit having a temperature sensor thermally coupled to the entering fluid flow of a heat exchanger, a temperature sensor thermally coupled to the exiting fluid flow of said heat exchanger, a differencing means to determine the temperature difference between said temperature sensors, and a recording and display means for the totalization and reading of the energy consumption monitored and wherein said fluid flow rate through said heat exchanger is controlled at a fixed amount by a flow regulator.

* * * * *